United States Patent [19]

Dore

[11] 4,437,331

[45] Mar. 20, 1984

[54] UNIVERSAL TRANSMISSION COUPLING AND A PROCESS FOR MANUFACTURING SUCH A COUPLING

[75] Inventor: Jacques Dore, Colombes, France

[73] Assignees: Automobiles Citroen; Automobiles Peugeot, both of Paris, France

[21] Appl. No.: 335,577

[22] Filed: Dec. 29, 1981

[30] Foreign Application Priority Data

Jan. 2, 1981 [FR] France ................................ 81 00025

[51] Int. Cl.³ .............................................. B21K 1/76
[52] U.S. Cl. ...................................... 72/360; 72/377; 464/145
[58] Field of Search ............... 464/143, 144, 145, 146, 464/906; 72/360, 375, 376, 377

[56] References Cited

U.S. PATENT DOCUMENTS

| | | | |
|---|---|---|---|
| 2,322,570 | 6/1943 | Dodge | 464/145 |
| 2,987,897 | 6/1961 | Spence | 464/145 |
| 3,675,459 | 7/1972 | Dohmann | 72/377 |

FOREIGN PATENT DOCUMENTS

| | | |
|---|---|---|
| 22872 | 6/1980 | European Pat. Off. |
| 1355477 | 2/1964 | France . |
| 2131627 | 11/1972 | France . |
| 2205140 | 5/1974 | France . |
| 2411996 | 12/1977 | France . |
| 2375487 | 7/1978 | France . |

Primary Examiner—Lowell A. Larson
Attorney, Agent, or Firm—Stevens, Davis, Miller & Mosher

[57] ABSTRACT

A universal coupling comprising an outer element integral with a first shaft having a spherical cavity inside which are formed grooves, an inner element integral with a second shaft and having an external surface in which grooves are also formed whose bottom has a section through a plane passing through the axis of the inner element formed by an arc of a curve, rolling means being disposed between the pairs of grooves, these rolling means being held in the windows of a cage. The inner element has on its outer surface a cylindrical surface portion situated substantially in the median region in the axial direction and extending at least substantially as far as the plane orthogonal to the axis containing the points of the bottoms the furthest from the axis, this portion being extended on each side by spherical surface portions intended to mate with the inner surface of the cage.

3 Claims, 2 Drawing Figures

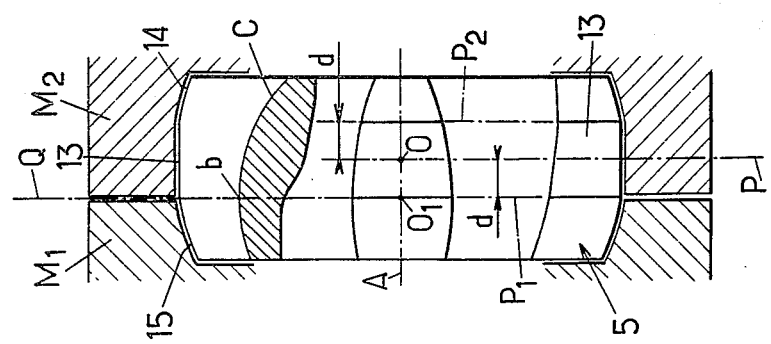
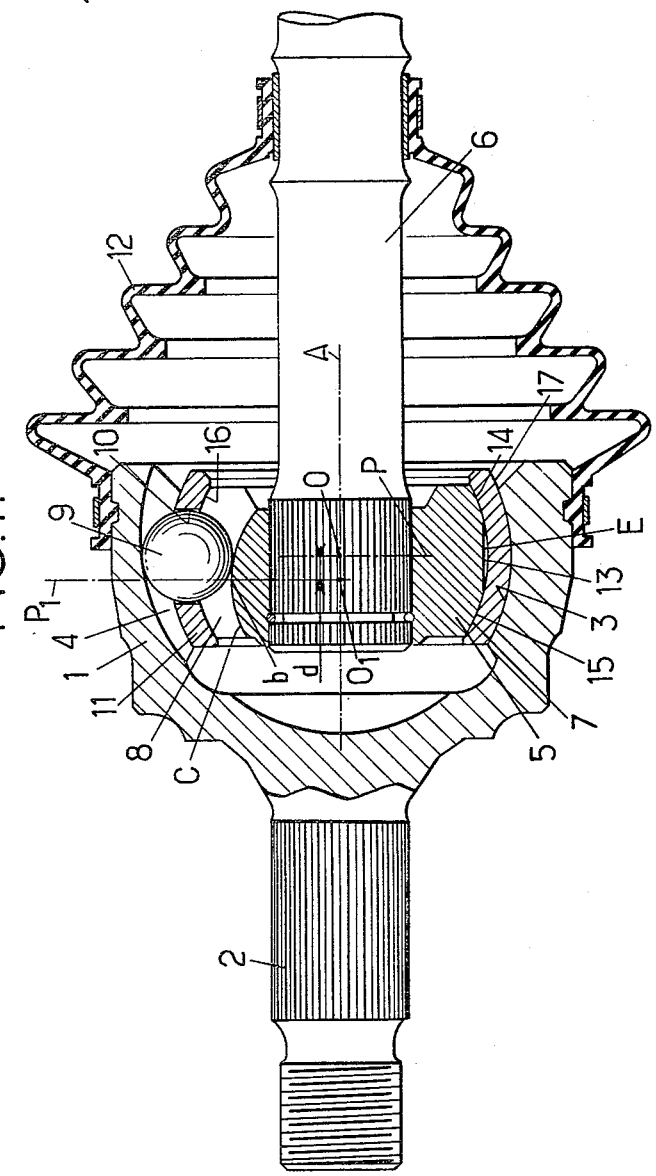

UNIVERSAL TRANSMISSION COUPLING AND A PROCESS FOR MANUFACTURING SUCH A COUPLING

The invention relates to a universal transmission coupling of the kind comprising an outer element, integral with a first shaft, having a spherical cavity inside which grooves are formed, an inner element integral with a second shaft and having an external surface on which grooves are also formed in number equal to those of the outer element, the section of the bottom of the grooves of the inner element through a plane passing through the axis of this element being formed by an arc of a curve, said inner element being placed within the outer element and rolling means such as balls being disposed in the housings formed by the pairs of grooves of the outer element and the inner element, these rolling members being retained in the windows of a cage disposed between the inner element and the outer element.

The invention has as its aim, especially, to make universal couplings of the kind in question such that they meet better than heretofore the different requirements of practice and more especially such that they are simpler and more economical in construction, while ensuring good operation.

In accordance with the invention, a universal coupling of the above-defined kind is characterized by the fact that the inner element has, on its outer surface, a cylindrical surface portion situated substantially in the median region, in the axial direction, of said element and extending, in this axial direction, at least substantially as far as the plane orthogonal to the axis of the inner element containing the points of the bottoms of the grooves of this element the furthest away from the axis, this cylindrical surface portion being extended on each side by spherical surface portions intended to mate with the inner correspondingly spherical surface of the cage.

Generally, the section of the bottom of the grooves of the inner element through a plane passing through the axis of this element is formed by an arc of a circle having its centre on the axis of said element, this centre being offset with respect to that of the spherical surface portions of the external surface of this element; in this case, the cylindrical surface portion extends axially at least substantially as far as the plane orthogonal to the axis of the inner element passing through the centre of said arc of a circle.

The invention also relates to a process for constructing such a universal coupling, this process being characterized by the fact that the inner element is obtained by a single precise forging operation, for example cold or semi-hot forging, with two dies having a single joint plane orthogonal to the axial direction of the inner element. This joint plane merges preferably with the plane orthogonal to the axis of the inner element which contains the points of the bottoms of the grooves the furthest away from the axis.

Cementation and hardening treatment may be provided for the inner element, after forging thereof.

A final operation for truing the inner element is generally performed.

The invention consists, apart from the arrangements outlined above, of certain other arrangements which will be more explicitly discussed hereafter in connection with a particular embodiment described in detail with reference to the accompanying drawing but which is in no wise limiting.

FIG. 1 of this drawing is an axial section of a universal coupling in accordance with the invention.

FIG. 2, finally, illustrates schematically a method of manufacturing the inner element of the coupling, this element being shown with parts cut away.

Referring to the drawing, particularly to FIG. 1, a universal transmission coupling is shown comprising an outer element or cup 1 integral with the first shaft 2 and having a spherical cavity 3 with centre 0, in which are formed toric grooves or furrows 4.

This coupling also comprises an inner element 5, integral with a second shaft 6, having an external surface 7 in which are formed grooves or furrows 8 equal in number to those of the outer element 1. These grooves 8 have a plane of symmetry passing through the axis of inner element 5.

The universal coupling comprises finally rolling means, such as balls 9 disposed in the housings formed by the pairs of grooves 4,8 of the outer element and of the inner element. These rolling means 9 are retained in the windows 10 of a cage 11, disposed between the inner element 5 and the outer element 1. A sealing sleeve 12 is further provided between the cup 1 and the second shaft 6.

The inner element 5 has, on its outer surface, a cylindrical surface portion 13 situated substantially in the median region, in the axial direction, of said element. This portion 13 is of revolution about the axis of element 5; it is extended, on each side, in the axial direction, by spherical surface portions 14,15 intended to mate with the inner surface 16, also spherical, of cage 11. The spherical surface portions 14,15 have their centre merging with that of the inner surface 16 of cage 11 when the cage is mounted on this element 5. This centre is situated on the axis of element 5.

The outer surfce 17 of cage 11 is also spherical, having the same centre as the inner surface 16; when the whole of the coupling is assembled, the centres of surface 17, of surface 16 and of portions 14,15 merge with the centre 0 of the spherical cavity 3.

The section of the bottom of each groove 8 through a plane passing through axis A is formed by an arc of a curve, turning its convexity outwardly. The edges of grooves 8, at the periphery of element 5, are also curvilinear as can be seen in FIG. 2.

More precisely, each groove 8 is toric: the section of the bottom of a groove 8 through a plane of symmetry passing through axis A of element 5 is an arc of a circle C having its centre $0_1$ situated on the axis of element 5, this centre $0_1$ being offset by a distance d with respect to the centre 0 of the spherical surface portions 14, 15. The points such as b of the bottoms of grooves 8 the furthest away from the axis of element 5 are situated at the intersection of the arc of circle C and the plane $P_1$ passing through the centre $0_1$ and orthogonal to the axis of element 5.

The cylindrical surface portion 13 extends axially as far as this plane $P_1$, on a first side of plane P passing through the centre 0 and orthogonal to the axis of element 5. The cylindrical surface portion 13 extends symmetrically on the other side of plane P, as far as plane $P_2$ (FIG. 2) situated at a distance d from plane P. The axial length of the cylindrical surface 13 is then equal or substantially equal to $2d$.

With the inner element 5 mounted inside cage 11, spaces E (FIG. 1) are formed between the cylindrical surface portion 13 and the inner surface 16 of the cage. These spaces E form lubricant reserves and provide good lubrication between element 5 and cage 11 and so good operation of the coupling.

The inner element 5 may be formed in a single precise forging operation, for example cold or semi-hot forging (with semi-hot forging, the piece to be forged is brought to a temperature of the order of 700° C. to 800° C. ). The forging is achieved with the help of two simple dies M1, M2, shown schematically in FIG. 2 and which are applied one against the other in a single joint plane Q orthogonal to the axial direction of element 5 and situated in the zone of the cylindrical surface portion 13. Preferably, the plane Q passes through the centre $0_1$ and merges then with plane $P_1$. The imprints of the dies correspond to the shapes complementary to those of the parts of the inner element 5 to be formed.

It should be noted that such a manufacturing process is possible because of the presence of the cylindrical surface portion 13. In fact, this surface 13 forms the locus of the points of the outer surface of element 5 the furthest away from the axis of this element. By adopting a joint plane Q merging with plane $P_1$, it is possible to extract element 5 from the two dies since this plane also passes through point b of the bottoms of grooves 8, the furthest away from said axis.

It would not be the same if the outer surface of element 5 were formed by a continuous spherical surface portion, from zone 14 to zone 15; in this case, in fact, the points of this surface the furthest away from the axis of element 5 would be situated in plane P; the die joint line for forging such an element would alternatively pass from plane P to plane $P_1$ which would require dies having teeth and which would be much more complicated and more expensive than in the case of the invention.

The inner element 5 of the invention obtained by forging has an extra thickness of material of about 3/10 millimeter on the grooves or tracks 8 and on its outer surface. This extra thickness is removed, after conventional cementation and hardening treatment, by truing. The size of the cylindrical portion 13 is thus reduced and its presence in the median region of element 5 does not adversely affect the centring of element 5 in cage 11; this centring is provided by the spherical surface portions 14,15 which cooperate with the inner surface 16 of the cage.

Such a solution requires no additional machining operation. It would not be the same in the case of precise forging construction, by using two flat ended dies, but whose joint plane merges with plane P.

The outer surface of element 5 would then present locally an extra thickness which would have to be removed by turning on the lathe before the cementation and hardening operations, so that the thickness of the treatment is maintained over the whole of the outer surface.

It should be noted that the taper required for removal from the dies, particularly for die M2 forging the cylindrical portion 13 is very small; this taper will disappear during truing.

The inner element 5 of the invention may then be readily formed by precise forging. The result is a substantial gain in material with respect to the conventional process of machining by removing material and so an economy.

The lubricating grease reserve formed by spaces E avoids seizing up.

I claim:

1. A process for manufacturing an inner element of a universal coupling having an outer element integral with a first shaft having a spherical cavity inside which are formed grooves; said inner element integral with a second shaft and having an external surface in which grooves are also formed, equal in number to those of the outer element, the section of the bottoms of the grooves of the inner element through a plane passing through the axis of this element being formed by an arc of a curve, said inner element being placed inside the outer element; and rolling means, such as balls, being disposed in the housings formed by the pairs of grooves of the outer element and of the inner element, these rolling means being retained in windows of a cage disposed between the inner element and the outer element;

said process comprising the step of:
forging said inner element by a single precise forging operation, particularly cold or semi-hot forging, by forming said inner element with two dies having an imprint corresponding to the shape complementary to that of the parts of the inner element to be formed and having a single joint plane orthogonal to the axial direction of the inner element and located so as to contain the points of the bottoms of the grooves of the inner element the furthest away from the axis, said inner element being forged with a cylindrical surface portion extending from said joint plane and continued on each side by spherical surface portions for mating with the corresponding spherical inner surfaces of the cage.

2. The process of claim 1, including the steps of subsequently treating said inner element by cementation and hardening after forging.

3. The process of claim 2, including the step of truing after cementation and hardening.

* * * * *